May 6, 1947.　　　　D. LEVIN　　　　2,420,142
FRUIT SQUEEZER
Filed Aug. 5, 1944
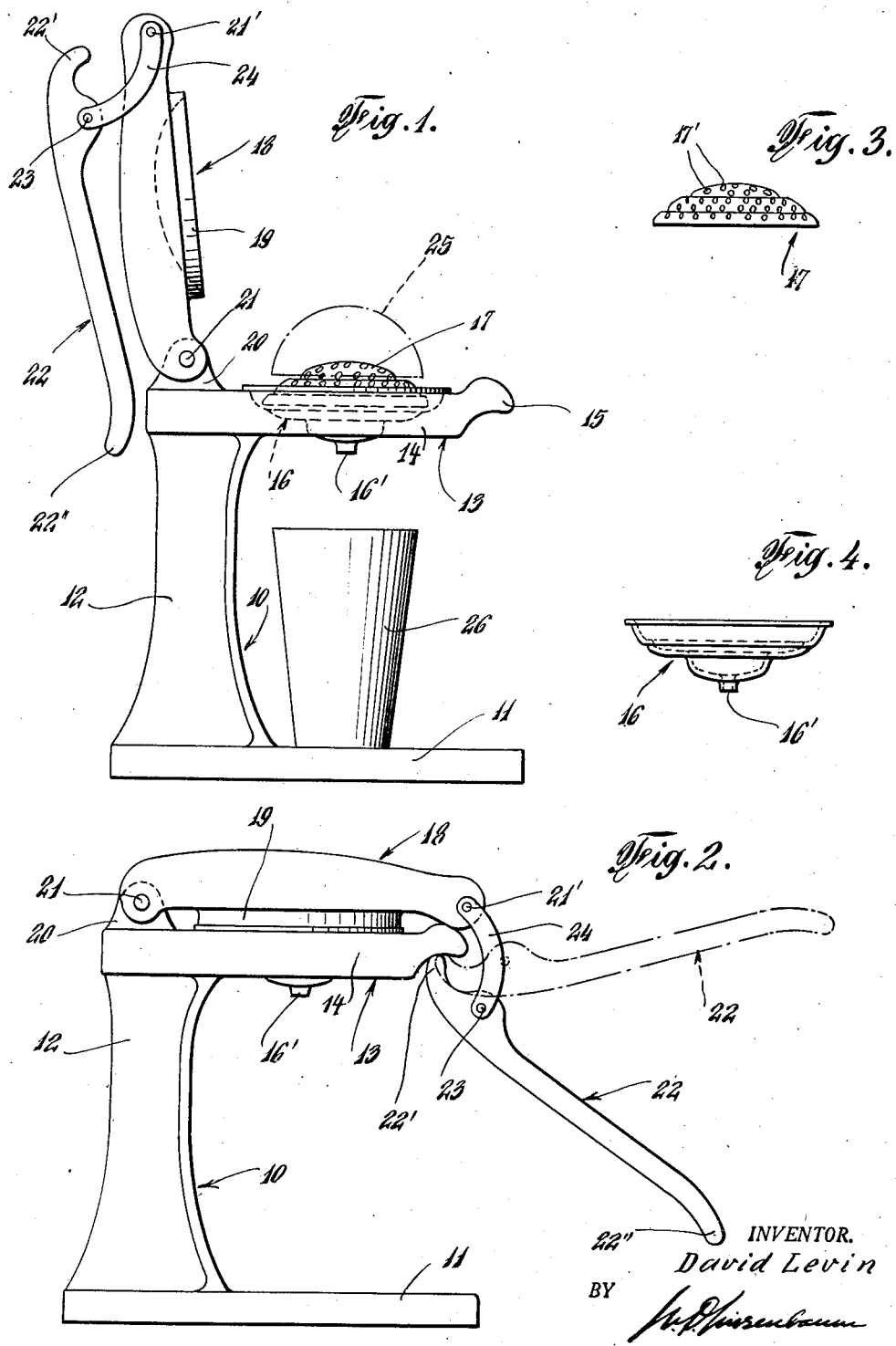
INVENTOR.
David Levin
BY
ATTORNEY Patented May 6, 1947

2,420,142

UNITED STATES PATENT OFFICE 2,420,142

FRUIT SQUEEZER

David Levin, Brooklyn, N. Y.

Application August 5, 1944, Serial No. 548,173

3 Claims. (Cl. 100—41)

The present invention relates to fruit squeezers and more particularly to the type where an orange or lemon is squeezed by a moveable member against a fixed member whereby the juice of the fruit is extracted.

The principal object of this invention is to provide a fruit squeezer of novel and improved construction, which is hand operated and whereby a substantially high pressure is exerted on the fruit.

Another object hereof is to provide a novel and improved fruit squeezer which is easy to use, simple in construction, readily cleanable, reasonable in cost and efficient in carrying out the purposes for which it is designed.

Other objects and advantages will become manifest as this disclosure proceeds.

In the accompanying drawings forming part of this application, similar characters of reference indicate corresponding parts in all the views.

Fig. 1 shows one embodiment of the present invention wherein the squeezer components are mounted on a stand. The squeezer members or jaws are in "open" position to receive an article of fruit on the stationary jaw. The view is a side elevation.

Fig. 2 is a similar view, showing the manner in which the device is operated to extract the juice from the fruit.

Figs. 3 and 4 are components of the stationary jaw, preferably made removeable therefrom, and from each other, to facilitate cleaning.

In the drawings, the numeral 10 designates a stand comprising a base 11 and an upright 12, whereby the device can rest on a table or counter. Above table level, the stand 10 has extending therefrom, the horizontally positioned stationary jaw indicated generally by the numeral 13, comprising a ring 14 having a lip 15 at its outward end. This ring supports a funnel member 16 holding an inverted cup-shaped perforated member 17. To facilitate cleaning, the members 16 and 17 are made removable from the rest of the device and from each other.

The moveable jaw of the squeezer is designated generally by the numeral 18. It has a cupped portion 19, and is pivotally secured at one end to the stationary jaw 13, by the pin 21, near where the ring member 14 is joined to the upright 12. The moveable jaw 18 at a point 21 near its free end, and a lever 22 at a point 23 nearer one of the ends thereof, are joined by a link 24, pivotally connected at its ends at such points respectively. The free end 22' of the shorter arm of the lever 22, may be slightly hooked, bent or cam-shaped, and is adapted to engage the lip 15 of the stationary ring 14.

When the squeezer jaws 13 and 18 are closed, the perforated member 17 fits into the cupped portion 19. The distance between the pivotal connections 21' and 23 of the link 24, is preferably made long enough to permit movement of the lever 22 to its most lowered position indicated in Fig. 2. The parts 16, 17 and 19, are preferably made of aluminum, stainless steel or other suitable fruit juice resistant material. The lever 22 should be comparatively strong and therefore is preferably a forging. The stand 10 and the ring member 14 may be cast of iron, aluminum or other suitable material.

In operation, the squeezer jaws 13 and 18 are "opened" by lifting the moveable jaw 18. A half orange 25, for instance, is placed on the perforated member 17, whereupon the moveable jaw 18 is then manually swung towards the stationary jaw 13. The lever 22 is then grasped in hand at 22'' and swung downward and set so that lever end 22' engages the lip 15. The lever 22 is pushed downward to its most lowered position shown in Fig. 2, whereupon the jaws are substantially "closed." It is evident that fruit 25, will be crushed or squeezed, thereby freeing the juice therefrom, which liquid will pass through the perforations 17' into the funnel 16 and out through funnel opening 16' into a tumbler or other suitable receptacle 26.

When through using the device, it is cleaned, and may be kept in "closed" condition as in Fig. 2, with the lever 22 set resting atop the moveable jaw 18, not illustrated, but readily evident.

This invention is capable of numerous forms and various applications without departing from the essential features herein disclosed. It is therefore intended that the specific embodiment shown herein be deemed illustrative and not restrictive and that the patent shall cover all patentable novelty herein disclosed; reference being had to the following claims rather than to the particular description herein to indicate the scope of this invention.

I claim:

1. In a fruit squeezer, a frame, a stationary jaw extending from the frame, a moveable jaw pivotally mounted at one of its ends on the frame; said jaws being adapted to receive an uncrushed fruit between them when separated, a lever having a cam at one end and a link pivotally secured at its ends respectively to the moveable jaw and at a point on the lever near the cam, a lip provided on the stationary jaw with which the cam is adapted to engage, said lip and cam being so constructed and arranged that upon manual manipulation of the lever, the cam is adapted to contact the lip on the stationary jaw while the fruit is substantially in condition as when initially placed between the jaws and by movement of the lever in one direction during such contact, the moveable jaw will move towards the stationary jaw, whereby the fruit between the jaws is crushed.

2. A fruit squeezer as defined in claim 1, wherein the stationary jaw is positioned substantially horizontal, the moveable jaw is positioned over the stationary jaw and the cam is adapted to contact the stationary jaw at a point on the underside of the stationary jaw; the pivotal axis of the moveable jaw being horizontal.

3. A fruit squeezer as defined in claim 1, wherein the stationary jaw is positioned substantially horizontal, the moveable jaw is positioned over the stationary jaw and the cam is adapted to contact the stationary jaw at a point on the underside of the stationary jaw; the pivotal connection of the moveable jaw to the frame, and the pivotal connection of the link to the moveable jaw being about horizontal axes in parallel relation at opposite ends of the moveable jaw respectively, whereby the lever may be set to rest on top of the moveable jaw when the jaws are closed.

DAVID LEVIN.

REFERENCES CITED

The following references are of record in the file of this patent:

UNITED STATES PATENTS

| Number | Name | Date |
|---|---|---|
| 132,486 | Pagett et al. | Oct. 22, 1872 |
| 252,871 | Fanning | Jan. 31, 1882 |
| 1,471,195 | Northern | Oct. 16, 1923 |
| 2,288,393 | Cheesman | June 30, 1942 |
| 2,090,913 | Johnson | Aug. 24, 1937 |
| 1,311,560 | Horsey | July 29, 1919 |
| 1,451,768 | Falls | Apr. 17, 1923 |